United States Patent
Bonnet et al.

(10) Patent No.: US 6,487,323 B1
(45) Date of Patent: Nov. 26, 2002

(54) STATIC IMAGE GENERATION METHOD AND DEVICE

(75) Inventors: Michel A. A. Bonnet, Paris (FR); Oriol Sans Estrada, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/366,697

(22) Filed: Aug. 4, 1999

(30) Foreign Application Priority Data

Aug. 5, 1998 (EP) .............................................. 98401997
Jun. 28, 1999 (EP) .............................................. 99401607

(51) Int. Cl.$^7$ ................................................. G06K 9/36
(52) U.S. Cl. ......................... 382/276; 382/284; 345/683
(58) Field of Search .............................. 382/276, 284, 382/254, 260, 265, 278, 308, 236, 154; 375/240.16; 348/154; 345/418, 683, 629

(56) References Cited

U.S. PATENT DOCUMENTS 5,943,445 A * 8/1999 Dufaux ........................ 382/236
5,999,662 A * 12/1999 Burt et al. ................... 382/284
6,037,988 A * 3/2000 Gu et al. ................. 375/240.16
6,097,854 A * 8/2000 Szeliski et al. ............. 382/284

* cited by examiner

Primary Examiner—Leo Boudreau
Assistant Examiner—Kanji Patel
(74) Attorney, Agent, or Firm—Russell Gross

(57) ABSTRACT

The invention relates to a method for generating a large static image M(n), such as a sprite or a mosaic, from a video sequence. This method first comprises, in view of a first accretion step, an estimation of the motion parameters related to the video objects of the sequence, with respect to the previously generated static image. Each video objects is then warped on the basis of said parameters, and the warped video objects are blended with the previously generated static image. According to the invention, said method also comprises (n−1) further accretion steps, but applied this time to the same video sequence considered in the reverse order. Each additional accretion step itself includes a warping sub-step, based on each successive video object considered in said reverse order and on the corresponding motion parameters already estimated, and a blending sub-step, pixel-based or region-based weighting coefficients being then computed in order to be taken into account during the blending steps.

4 Claims, 1 Drawing Sheet

STATIC IMAGE GENERATION METHOD AND DEVICE

FIELD OF THE INVENTION

The invention relates to a method for generating a large static image, such as a sprite or a mosaic, from a video sequence including successive video objects VOs, said method comprising, in view of the accretion of said static image, the steps of:

(A) estimating motion parameters related to the current video object V0(n) of the sequence, with respect to the previously generated static image;

(B) warping said current video object V0(n), on the basis of said estimated motion parameters;

(C) blending the warped video object WV0(n) thus obtained with said previously generated static image; and to a corresponding device. This invention may be useful in relation with the MPEG-4 and MPEG-7 standards.

BACKGROUND OF THE INVENTION

The descriptors and description schemes that will be standardized within the frame of MPEG-7 (MPEG-7 has for object to standardize within some years generic ways to describe multimedia content) will allow fast and efficient retrieval of data, on the basis of various types of features such as text, color, texture, motion and semantic content. In this MPEG-7 context, a mosaic can also play a useful role, as it will be shown.

Sequences, video shots and key-frames follow a hierarchical structure: a video shot is a particular sequence which shows a single background, while a key-frame is a visual representation in only one image of this shot. A visual representation of a video sequence can be obtained by the extraction of key-frames from a previous shot partition of the whole sequence. The process then chooses as key-frame one image of each shot, so that it only shows 25 a part of the video shot that may not be the most reliable one for representation. A mosaic seems however to be a better choice than a key-frame, when it is wanted to show the whole video shot in a single panoramic view of background information. As explained for instance in the article "Efficient representations of video sequences and their applications", M. Irani and al., Signal Processing: Image Communication, vol.8, 1996, pp.327–351, a mosaic image is a kind of large static image constructed from all frames in a scene sequence, giving a panoramic view of said scene. From this panoramic view, it is then possible to extract for instance the main features of the sequence, such as chrominance or luminance histograms, objects shapes, global motion parameters, and so on (all these features constitute relevant standard descriptors for MPEG-7 and are useful for MPEG-7 compliant search engines).

The definition of a mosaic may be compared to that of a sprite, as used in the context of the MPEG-4 standard. A sprite is a large static image composed of the pixels in an object visible through an entire sequence. This static image forms a panoramic view whose some portions may not be visible in some frames because of foreground objects or camera motion. If all the relevant pixels throughout the entire sequence are collected, a complete panoramic view (called background sprite) is obtained, which can be efficiently transmitted (or stored) and used later for re-creating portions of frames.

As described for instance in the case of a sprite in the document WO 98/59497 (but this description can be applied to the case of a mosaic), three main steps may compose a sprite or mosaic generation (in the following, the generic word "static image" will be therefore used in place of sprite or mosaic). A motion estimation step is first provided, in order to find the motion parameters that will allow to merge correctly a current frame F(n) with the static image M(n−1) already composed of the previous frames F(1), F(2), . . . , F(n−1). The inverse parameters are then computed, so that the current frame may be compensated in the direction of these inverted parameters ; this second step is also called warping. The warped current frame F(n) is finally blended with M(n−1) in order to form a new accreted static image M(n), with which the next incoming frame F(n+1) will be merged, and so on.

However, an observation of the obtained static image may lead to consider that some parts of said static image are not clean. For instance, some parts of a moving object have not been completely removed.

SUMMARY OF THE INVENTION

It is therefore an object of the invention to propose a method allowing to generate a static image without such artefacts.

To this end, the invention relates to a method such as described in the introductory paragraph of the description and which is moreover characterized in that:

(1) said method also comprises (n−1) further accretion steps applied to the same video sequence considered in the reverse order, each additional accretion step itself including a warping sub-step, based on each successive video object considered in said reverse order and on the corresponding estimated motion parameters, and a blending sub-step, provided between the warped video object thus considered and the static image generated at the end of the previous accretion step.

It is another object of the invention to propose a static image generation device for carrying out said method.

To this end, this invention relates to a device for generating a large static image, such as a sprite or a mosaic, from a video sequence including successive video objects VOs, said device comprising, in view of the accretion of said static image in a first accretion stage:

(A) a motion estimation circuit, provided for estimating a motion information related to the relative motion between the current video object VO(n) of the sequence and the previously generated static image;

(B) a first warping circuit, provided for defined on the basis of said current video object and said motion information a warped video object WVO(n);

(C) a first blending circuit, provided for blending the warped video object WVO(n) thus obtained with said previously generated static image, said previously generated static image being thus updated by replacement by the new one;

characterized in that it also comprises at least a further accretion loop including a second warping circuit, a second blending circuit provided for blending the warped video object thus obtained with the previously generated static image, and a memory for storing said generated static image, said memory and said second warping and blending circuits being organized for carrying on the updated static image available at the output of the first blending circuit (n−1) additional accretion steps taking into account on the one hand the same video sequence but considered in the reverse order and on the other hand the estimated motion information corresponding to each concerned video object of said reverse sequence, and, between said warping and blending circuits of said first accretion stage or of anyone of said further accretion loops, means for computing for each picture element a weighting coefficient correlated to the error between the warped video object and the generated static image and taken into account by the blending circuit during the blending step.

BRIEF DESCRIPTION OF THE DRAWINGS

The particularities and advantages of the invention will now be explained in a more detailed manner, with reference to the accompanying drawings in which.

DESCRIPTION OF THE INVENTION

Figure 1:
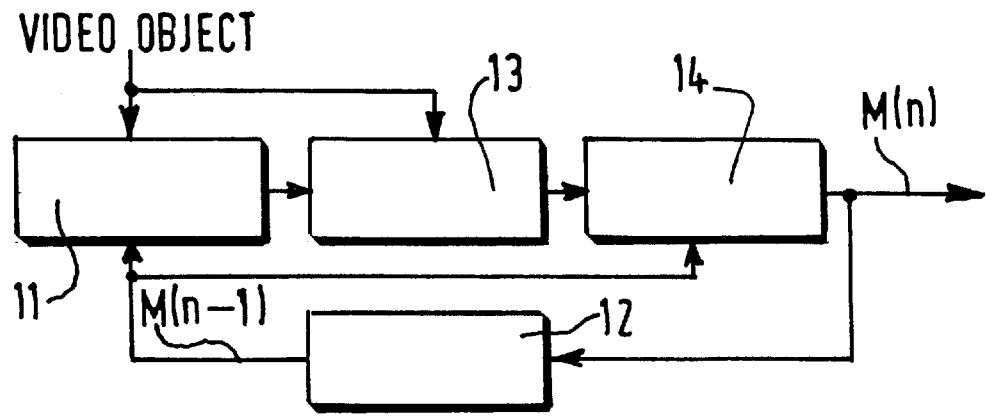
FIG. 1 shows a known scheme of a static image generation device.

A device for the implementation (for instance in the case of a mosaic) of the method described in the document WO 98/59497 previously cited is illustrated in FIG. 1. A motion estimation circuit 11 receives successive video objects, in the present case successive frames F(1), F(2), F(3), . . . , F(i), . . . , F(n−1), F(n), and determines the motion parameters that will allow to merge correctly the incoming frame F(n) with the previously generated mosaic M(n−1) available in a memory 12. After having estimated these parameters, they are used in a warping circuit 13 that transforms the video object to the coordinate system of the mosaic M(n−1). A blending circuit 14 finally allows to build the new mosaic M(n) refreshing the old one M(n−1).

The principle of the method according to the invention is to apply several times the accretion step, once a first mosaic such as M(n) has been built. These further accretions begin this time at the last frame and finish with the first one, which allows to give less importance to the new previous frames and leads to a cleaner static image. In these additional accretion steps, the previously generated mosaic is now taken as a reference to build an error map that will be useful in view of the following blending step.

Figure 2:
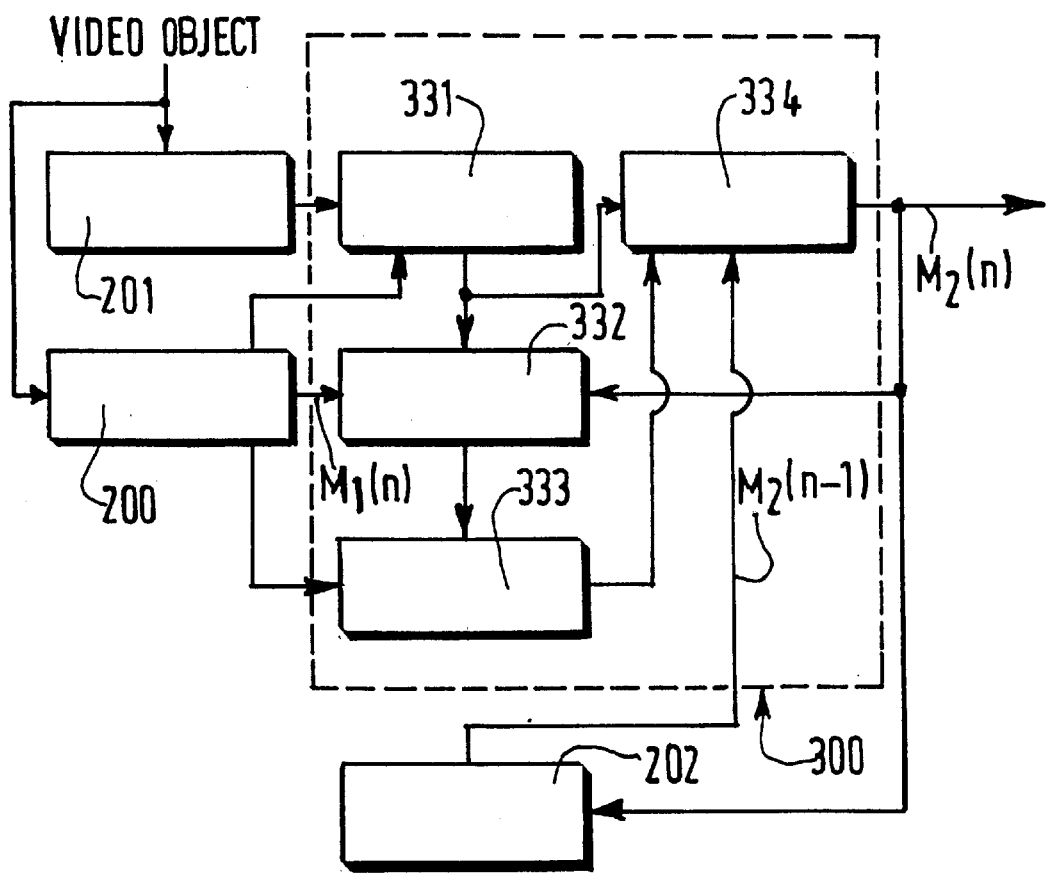
FIG. 2 shows an embodiment of a static image generation device allowing to implement the method according to the invention.

A device for the implementation of said method is shown in FIG. 2 and comprises the following elements. A first accretion stage 200 allows to generate a first mosaic $M_1(n)$ according to the scheme of FIG. 1. To this end, said mosaic generation stage 200 comprises a motion estimation circuit, a memory, a warping circuit and a blending circuit identical to the corresponding elements 11 to 14 and working in the same manner, and therefore not shown. In the same time, the successive input frames F(1), F(2), F(3) . . . , F(i), . . . , F(n) are stored in a buffer 201. The output of the buffer 201, read by beginning at the last frame (in order to finish with the first one), is sent towards a second accretion stage 300. Said stage 300 itself comprises in series a (second) warping circuit 331, that receives on the one hand said output of the buffer 201 and on the other hand the corresponding motion parameters previously determined (for each of these frames now considered in the reverse order) in the first accretion stage 200, a pixel-based weighting circuit, and a (second) blending circuit 334.

According to the invention, an error map is constructed in a circuit 332 by comparison between the output of the second warping circuit 331 and the output $M_1(n)$ of the first accretion stage 200. The pixel-based weighting circuit, including said circuit 332 and a coefficient computation circuit 333, computes for every picture element (pixel) a weighting coefficient $W_{WF(n)}$, given by the following expression (1):

$$w_{WF(n)}[x, y] = \frac{1}{r(x, y)} \frac{d}{dr} \rho(r(x, y)) \quad (1)$$

where ñ is a symmetrical, positive-definite function known as the lorentzian M-estimator and r(x,y) is the error between the warped current image and the mosaic at the pixel (x,y). The whole set of weighting coefficients thus computed by the pixel-based weighting circuit (332, 333) is then used by the blending circuit 334. In said circuit, a weight mean formula taking into account the weighting coefficients $W_{WF(n)}[x,y]$ is then used to calculate the luminance and chrominance values of a new mosaic $M_2(n)$ resulting from the blending step. The blending formula (2) is indeed, for each pixel [x,y]:

$$M_2(n)[x, y] = \qquad (2)$$
$$\frac{{}^w M_2(n-1)[x, y] \cdot M_2(n-1)[x, y] + {}^w WF(n)[x, y] \cdot WF(n)[x, y]}{{}^w M_2(n-1) + {}^w WF(n)}$$

where the definitions of the terms are the following:
(a) n>0
(b) whatever (x,y), $W_{M2(0)} = 0$;
(c) whatever (x,y), $$w_{WF(n)}[x, y] = \frac{1}{r(x, y)} \frac{d}{dr} \rho(r(x, y));$$

(d) $W_{M2(n)} = W_{M2(n-1)} + W_{WF(n)}$.

The mosaic $M_2(n)$ thus generated at the output of the second accretion stage 300 is stored in a (second) memory 202 for refreshing the previously generated mosaic $M_2(n-1)$.

This process of accretion is then iteratively reproduced for each successive frame read from the buffer 201 (up to the first one F(1)). The motion parameters corresponding to each of these frames are available in the stage 200 (they have been defined during the first accretion step implemented in said stage), and the newly generated mosaic $M_2(n)$ is stored in the memory 202, in order to be available for each following blending step (the output of said memory 202 is received by the blending circuit 334).

The present invention is obviously not limited to the previous embodiment. The blending steps carried out in the blending circuit may be preceded by preprocessing sub-steps such as described for instance in the European Patent filed on Aug. 5, 1998, with the filing Number N°98401997.6 (PHF98584). This document describes inter alia a mosaic generation method incorporating an additional weighting sub-step between the warping and blending steps. For each pixel (picture element) of the considered video object (such as a frame), a weighting coefficient correlated to the error between the warped video object and the previously generated mosaic is computed, and the blending formula then takes into account each of said weighting coefficients. It is also possible to include between this additional weighting sub-step and the blending step a spatial filtering sub-step, based for example on a morphological segmentation and provided for converting said pixel-based weighting operation into a region-based one allowing to detect and discard regions considered as outliers. These preprocessing sub-steps may also be used before the blending step carried out in the blending circuit of the mosaic generation stage 200.

It must also be indicated that the invention is not dependent of the type of the video sequence. In the described example, the video sequence comprises successive frames F(1), F(2), . . . , F(n−1), F(n) of rectangular shape, but it is clear that it may comprise any type of video objects, for example video objects (VOs) of any type of shape such as defined in relation with the MPEG-4 standard according to object-oriented segmentation schemes. The term "video object" will be therefore chosen as representing here any type of video information such as processed according to the method and device described hereinabove, and such video objects will be designated by the references V0(1), V0(2), . . . , V0(n−1), V(n).

What is claimed is:

1. A method for generating a large static image, such as a sprite or a mosaic, from a video sequence including successive video objects VOs, said method comprising, in view of the accretion of said static image, the steps of:
   (A) estimating motion parameters related to the current video object V0(n) of the sequence, with respect to the previously generated static image;
   (B) warping said current video object V0(n), on the basis of said estimated motion parameters;
   (C) blending the warped video object WV0(n) thus obtained with said previously generated static image; characterized in that:
   (1) said method also comprises (n−1) further accretion steps applied to the same video sequence considered in the reverse order, each additional accretion step itself including a warping sub-step, based on each successive video object considered in said reverse order and on the corresponding estimated motion parameters, and a blending sub-step, provided between the warped video object thus considered and the static image generated at the end of the previous accretion step.

2. A method according to claim 1, characterized in that it also comprises, between the warping and blending steps of the first accretion step or of anyone of said further accretion steps, an additional step for computing, for each picture element of the current video object V0(n), a weighting coefficient $W_{WF(n)}[x,y]$ correlated to the error between the warped video object WV0(n) and the generated static image at each picture element [x,y], the blending step provided for determining the newly generated static image then taking into account said weighting coefficients.

3. A method according to claim 1, characterized in that it also comprises, between the warping and blending steps of the first accretion step or of anyone of said further accretion steps, an additional step itself including:

a first pixel-based error map definition sub-step, provided for constructing, for each picture element of the current video object V0(n), a map of the error r(x,y) between the warped video object WV0(n) and the static image at said picture element [x,y];

a second spatial filtering sub-step, provided for transforming said pixel-base error map into a region-based error map;

a thrid weighting sub-step, provided for computing for every pixel a weighting coefficient $W_{WF(n)}[x,y]$ correlated to said error and in the same time for selecting regions that belong to foreground objects and discarding them as outliers before the blending step, said blending step provided for determining the newly generated static image then taking into account said weighting coefficients.

4. A device for generating a large static image, such as a sprite or a mosaic, from a video sequence including successive video objects VOs, said device comprising, in view of the accretion of said static image in a first accretion stage:
   (A) a motion estimation circuit, provided for estimating a motion information related to the relative motion between the current video object VO(n) of the sequence and the previously generated static image;
   (B) a first warping circuit, provided for defined on the basis of said current video object and said motion information a warped video object WVO(n);
   (C) a first blending circuit, provided for blending the warped video object WV0(n) thus obtained with said previously generated static image, said previously generated static image being thus updated by replacement by the new one;
characterized in that it also comprises at least a further accretion loop including a second warping circuit, a second blending circuit provided for blending the warped video object thus obtained with the previously generated static image, a memory for storing said generated static image, said memory and said second warping and blending circuits being organized for carrying on the updated static image available at the output of the first blending circuit (n−1) additional accretion steps taking into account on the one hand the same video sequence but considered in the reverse order and on the other hand the estimated motion information corresponding to each concerned video object of said reverse sequence, and, between said warping and blending circuits of said first accretion stage or of anyone of the further accretion loops, means for computing for each picture element a weighting coefficient correlated to the error between the warped video object and the generated static image and taken into account by the following blending circuit during the blending step.

* * * * *